No. 795,244. PATENTED JULY 18, 1905.
C. M. ARMSTEAD.
DRIVING MECHANISM.
APPLICATION FILED FEB. 16, 1905.
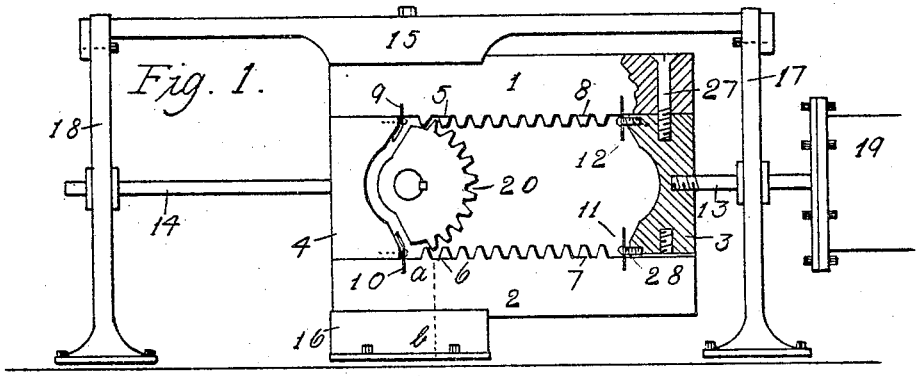
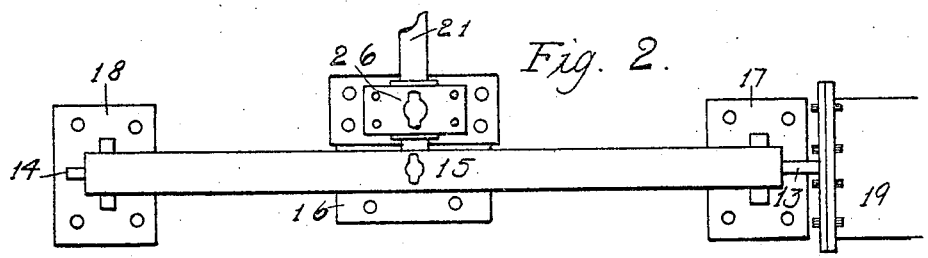
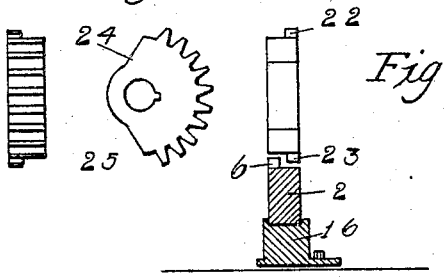
Witnesses.
Thomas Richardson
Herbert Gingell
Inventor.
Charles Melvin Armstead, No. 795,244. Patented July 18, 1905.

UNITED STATES PATENT OFFICE.

CHARLES MELVIN ARMSTEAD, OF VANCOUVER, CANADA.

DRIVING MECHANISM.

SPECIFICATION forming part of Letters Patent No. 795,244, dated July 18, 1905.

Application filed February 16, 1905. Serial No. 245,899.

*To all whom it may concern:*

Be it known that I, CHARLES MELVIN ARMSTEAD, laborer, a subject of the King of Great Britain, residing at Vancouver, Province of British Columbia, Canada, have invented certain new and useful Improvements in Driving Mechanism, of which the following is a specification.

This invention is applicable to machinery in which reciprocating motion is converted into rotary motion, as in steam and other engines, and also to machinery driven by foot-power, and to machinery in which rotary motion is converted into reciprocating motion, as in wind-engines.

My invention consists of a rectangular geared frame, two longest sides being racks geared on their inside edge, which, given a reciprocating motion, said racks act upon and rotate a geared crank or geared wheel geared for a part of its circumference or where a geared crank or geared wheel geared for a part of its circumference, and given a rotary motion, acts upon and reciprocates a geared frame.

The object of my invention is to utilize the motive agent to the fullest advantage, to insure a uniform and constant transmission of the power developed, tangential pressure being exerted at a given point for almost the full length of stroke and there being very little component, if any, in direction of (crank) shaft.

In the accompanying drawings, Figure 1 is an upright view of the invention as it would appear if driven horizontally by a steam or other engine. Fig. 2 is a top view of Fig. 1 and shows position of shaft in relation thereto; Figs. 3, 4, and 5, three views of geared crank or geared wheel, also showing section taken on dotted line *a b*, Fig. 1, of bottom rack and guide in connection with Fig. 5.

The cylinder 19, a piston in said cylinder, having a connecting-rod 13 attached, said connecting-rod reciprocating through a guide in a standard 17, connects with a frame constructed as follows: a rectangular geared frame, two longest sides are racks 1 2, having teeth on their inside edge, as shown, eleven teeth on each rack. Second teeth 5 6 7 8 from each end of racks 1 2 are less than half a tooth in width to allow for clearance, as shown at Fig. 5. The other two sides of frame are called, respectively, "drive-head" 3 and "guide-head" 4. The manner of constructing and connecting racks and heads where they join may be accomplished in different ways, as shown. The two racks 1 2 can be adjusted away from or toward each other by means of screws 27 inserted through a hole in the ends of said racks and screwing into ends of other sides or heads 3 4 of frame, other end being adjusted the same way. Screws are countersunk. The connecting-rod 13 is screwed into the center of drive-head 3. On opposite side of frame a second rod, called "guide-rod" 14, is screwed into the center of guide-head 4, both rods being in line, guide-rod 14 reciprocating through a guide in a standard 18. Four flat springs 9 10 11 12 are attached to inside corners of frame, one at each corner, one end of springs being let into racks 1 2 a certain distance, other end of springs extending a certain distance beyond addendum-line of teeth on said racks, said springs being secured by screws 28 to heads 3 4. Rack sides of frame slide in guides 15 16. Said guides are shown shortened to expose construction of geared frame and its relation to said guides. The two standards 17 18 and the two guides 15 16 form a framework in which the rectangular geared frame 1 2 3 4 reciprocates, rack sides of frame sliding in guides, connecting-rod 13 and guide-rod 14 attached one at each end of frame and reciprocating through guides in standards 17 18, respectively, all working parts in contact suitably lubricated. Connecting-rod 13 connects with a piston of steam or other engine or with some other motive agent. As shown, guide 16 and standards 17 18 are secured to floor, ends of guide 15 resting on and secured to standards 17 18, the frame 1 2 3 4 being driven and given a reciprocating motion by means of connecting-rod 13. Gearing on racks on said frame meshes with, acts upon, and rotates a geared crank or geared wheel 20, geared for a certain part of its circumference and attached onto a shaft 21, Fig. 2, revolving in the bearing 26. Geared wheel 20 is situate between racks of frame, shaft 21 being at right angles to said frame. The geared crank or geared wheel 20, Figs. 3, 4, 5, has ten teeth occupying or covering an arc on its circumference of about one hundred and fifty degrees, called "geared face." The two teeth 22 23, one at each end of geared face, are less than half a tooth in width to allow for clearance with clearance-teeth 5 6 7 8 on racks 1 2, Fig. 1. The circumference is continued on the root-circle a distance of about fifteen degrees at each end of geared face, said arcs called "root-faces." From root-faces two shoulders 24 25, Fig. 3, connect with a hub-face or hub covering an arc of about one hundred and twenty-five degrees of a circle in diameter, approximately half of pitch diameter of said geared wheel 20, each one of said shoulders 24 25 occupying an arc on the circumference of about 27.5 degrees. Teeth on said geared wheel 20 and on racks 1 2 are the same pitch—in this case twenty-four pitch gear. Half the circumference (one hundred and eighty degrees) on the pitch-circle of geared wheel 20 is equivalent to length of stroke. Enough clearance is left at each inside end of frame 1 2 3 4 for geared wheel 20. As shown in Fig. 1, the geared frame is at the end of its stroke. The top rack 1 has been engaging geared wheel 20 for length of said stroke, the engine working under as the geared wheel rotates and leaves the said rack. The shoulder 25, Fig. 3, on said geared wheel comes in contact with spring 10, which has a cushioning effect. In machinery in which the movement is never reversed the springs 9 and 11 may be made stronger than the other two springs 10 and 12, thereby exerting a certain pressure or force on the shoulder 24, Fig. 3, of geared wheel 20. When near the end of stroke, the clearance-teeth 22 23 on geared wheel 20 clear the clearance-teeth 5 6, respectively, on racks 1 2. The gearing on rack 2 on forward movement or stroke from cylinder 19 meshes with the gearing on geared wheel 20, rotating same. About the end of said stroke the shoulder 25 on geared wheel 20 cushions against spring 12, clearance-teeth 22 23 clearing clearance-teeth 7 and 8, respectively, spring 11 exerting a certain pressure on the shoulder 24, the gearing on rack 1 again acting on geared wheel 20, Figs. 3, 4, and 5, three views of geared crank or geared wheel 20, showing construction of clearance-teeth 22 23 and their relation to other teeth, Fig. 5 also showing section of rack 2, Fig. 1, with clearance-tooth 6 for clearance and its relation to clearance-tooth 23 on geared wheel 20 when in motion, also section of guide 16 for rack 2, the aforesaid sections being taken on dotted line $a\ b$, Fig. 1.

Fig. 1, by turning the drawing on its side, will illustrate the invention as applied to machinery driven by a wind-wheel or other motive agent in which the movement would be reversed—that is, conversion of rotary into reciprocating motion. In this position cylinder 19 will be at bottom of sheet, standard 18 at top.

A shaft 21, Fig. 2, is given a rotary motion by some motive agent. A geared wheel 20, constructed as before mentioned, is attached onto shaft. Gearing on said geared wheel 20 meshes with, acts upon, and reciprocates a rectangular geared frame 1 2 3 4, constructed as before mentioned, one rack being engaged one way for duration of half of revolution of geared wheel 20, the other rack being engaged for duration of other half of revolution the other or reverse way, clearance-teeth clearing, as before, and springs 9 10 11 12 having a cushioning or driving effect, respectively, against shoulders 24 25, Fig. 3. We have now the frame 1 2 3 4 reciprocating in a framework composed of guides 15 16 and standards 17 18. Rack sides of frame slide in said guides 15 16. Rods 13 14, one attached to each end or head 3 4 of frame, reciprocate through guides in standards 17 18. The connecting-rod 13 connects with mechanism to be driven.

What I claim as my invention, and desire to secure by Letters Patent, is—

In driving mechanism, the combination of a frame, adjustable opposed parallel racks in said frame, having part teeth near their ends, springs attached to the inside corners of said frame and extending beyond the addendum-line of the rack-teeth, guides for the frame, rods attached to each end of the frame, standards, serving as guides to said rods, and a mutilated pinion engaging said racks and springs.

In testimony whereof I have signed my name to this specification in the presence of two subscribing witnesses.

CHARLES MELVIN ARMSTEAD.

Witnesses:
THOMAS RICHARDSON,
HERBERT GINGELL.